United States Patent [19]

Long

[11] Patent Number: 5,058,922
[45] Date of Patent: Oct. 22, 1991

[54] MOTOR VEHICLE SAFETY BELT COMFORT DEVICE

[76] Inventor: S. Craig Long, 603 Tulip La., Vero Beach, Fla. 32963

[21] Appl. No.: 422,082

[22] Filed: Oct. 16, 1989

[51] Int. Cl.$^5$ .............................................. B60R 22/00
[52] U.S. Cl. .................................. 280/808; 297/483; 297/486; 248/206.2; 24/301
[58] Field of Search ............... 280/808, 751, 801, 748, 280/727, 804; 297/468, 474, 483, 486; 24/300, 301, 17 AP, 489, 643; 248/206.2, 206.3, 206.4, 205.5, 362, 363, 205.2

[56] References Cited

U.S. PATENT DOCUMENTS

| | | | |
|---|---|---|---|
| 1,782,057 | 11/1930 | Bollinger | 24/301 |
| 3,228,613 | 1/1966 | Goldstein | 245/205.5 |
| 3,521,901 | 7/1970 | Wackym | 297/483 |
| 3,727,272 | 4/1973 | Rhodes | 24/300 |
| 4,228,569 | 10/1980 | Snyder | 24/489 |
| 4,315,638 | 2/1982 | Takada | 280/804 X |
| 4,319,769 | 3/1982 | Compeau et al. | 280/808 |
| 4,600,217 | 7/1986 | Naumann et al. | 297/483 X |
| 4,609,205 | 9/1986 | McKeever | 297/483 X |
| 4,648,572 | 3/1987 | Sokol | 280/206.2 |
| 4,648,625 | 3/1987 | Lynch | 297/483 X |

Primary Examiner—Charles A. Marmor
Assistant Examiner—Tamara L. Finlay
Attorney, Agent, or Firm—Carroll F. Palmer

[57] ABSTRACT

A device is provided for improving comfort of a person seated in a motor vehicle using a safety belt assembly provided therein that includes a shoulder strap. Such device includes as essential parts (a) a suction cup that may be releasably adhered to the windshield, side window or other part of said motor vehicle, (b) a clip that may be releasably attached to a part of the shoulder strap, (c) a cord attached to one end to the suction cup and slidably looped through the clip creating a first section or cord that extends from the suction cup to the clip and a second section of cord that leads away from the clip but does not connect with the suction cup and (d) a cord jam member for manually adjusting the length of the first section of the cord.

3 Claims, 1 Drawing Sheet

MOTOR VEHICLE SAFETY BELT COMFORT DEVICE

BACKGROUND OF THE INVENTION

1. Field of the Invention

This application relates to motor vehicle safety belt comfort devices. More particularly, it concerns a device that relieves constant tension on the chest, neck and shoulder portions of a user by the shoulder strap of the safety belt assembly.

2. Description of the Prior Art

Motor vehicles are currently required to be equipped with safety belt assemblies for the protection of occupants in the event of impact of the vehicle with another vehicle or other object. Typically these assemblies include a shoulder strap that passes across the chest, neck and shoulder portions of an occupant of the vehicle when the belt assembly is properly fastened. Constant contact of the shoulder strap with the chest, neck and a shoulder of the occupant can create discomfort and annoyance to such occupant.

Vehicle manufacturers and users both have been fully aware of the discomfort and annoyance problem. Hence, it has been addressed with the development of a variety of devices designed to mitigate the problem as shown by U.S. patents covering such devices, including U.S. Pat. Nos. 3,521,901; 4,315,638; 4,600,217; 4,609,205 and 4,648,625.

The present invention further addresses this safety belt comfort problem and provides an improved form of device to mitigate it with less expense and complication than related devices of the prior art.

OBJECTS

A principal object of the invention is the provision of a device that relieves constant tension on the chest, neck and shoulder portions of a user by the shoulder strap of the safety belt assembly in a motor vehicle.

Another object is the provision of such a device that can be made and sold at a price less than related devices of the prior art, but is highly effective in mitigating the safety belt discomfort problem.

A further object is the provision of such an improved device that requires no alteration of the motor vehicle, e.g., drilling, for its installation and use.

Yet another object is the promotion of use of safety belt systems in general, thus helping to lower injury and deaths attributable to motor vehicle accidents.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a device for improving comfort of a person seated in a motor vehicle and using a safety belt assembly provided therein that includes a shoulder strap.

The device comprises (a) suction cup means that may be releasably adhered to the windshield, side window or other part of the motor vehicle, (b) clip means that may be releasably attached to a part of the shoulder strap, (c) a cord attached at one end to the suction cup means and slidably looped through the clip means creating a first section of the cord that extends from the suction cup means to the clip means and a second section of the cord that leads away from the clip means but does not connect with the suction cup means, and (d) means for adjusting the length of the first section of the cord, such means having at least one opening therein through which the first section passes.

In one embodiment of the new devices, the means for adjusting the cord length comprises a disc shaped body member having front and back faces and, at least three circular bores extending through the body member from the front face to the back face. The first section of the cord passes through two of the bores and the second section of the cord is knotted through another of the bores.

In another embodiment, the means for adjusting the cord length comprises an elongated body member and a pair of tunnels of triangular cross-section extend axially through the body member with their apexes facing one another. The first section of the cord passes through one of the tunnels and the second section of the cord passes through the other of the tunnels.

Preferably, the suction cup means includes a flexible cup portion and a post extending laterally from such portion with the cord attached to such post.

Also, the clip means includes a first jaw member, a second jaw member pivoted to the first jaw member, a closing bias spring and an opening in one of the jaw members through which the cord is looped.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
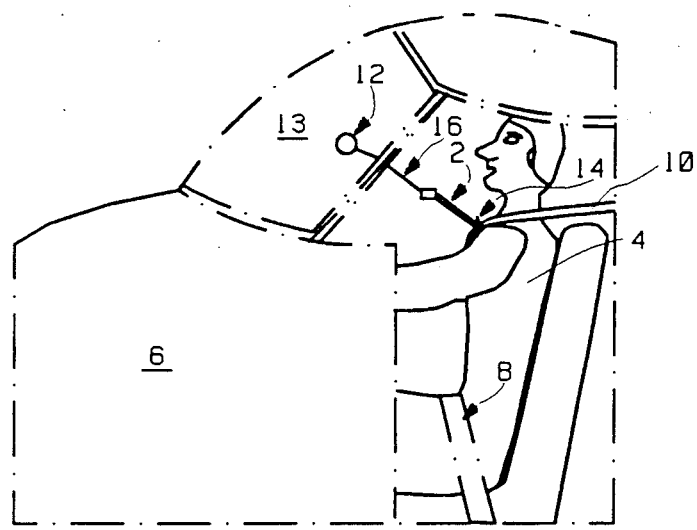
FIG. 1 is schematic lateral view of the drivers seat portion of a motor vehicle equipped with a device of the invention.
Figure 2:
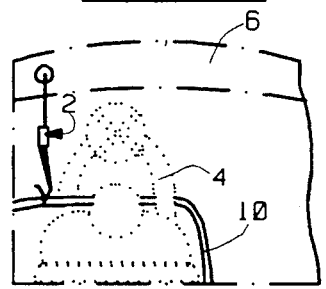
FIG. 2 is a schematic plan view comparable to FIG. 1.

With reference in detail to the drawings, the device 2 of the invention is for improving comfort of a person 4 seated in a motor vehicle 6 and using a safety belt assembly 8 provided therein that includes a shoulder strap 10.

The device 2 comprises suction cup means 12 that may be releasably adhered to the windshield 13 or other part of the motor vehicle 6, e.g., the side window adjacent the occupant, and clip means 14 that may be releasably attached to a part of the shoulder strap 10.

A cord 16 is attached at one end 18 to the suction cup means 12 such as by screw 20 and is slidably looped through the clip means 14 creating a first section 22 of the cord that extends from the suction cup means 12 to the clip means 14 and a second section 24 of the cord 16 that leads away from the clip means 14, but does not connect with the suction cup means.

Means 26 for adjusting the length of the first section 22 of the cord has an opening, in the form of a tunnel therein, through which the first cord section 22 passes.

Figure 3:
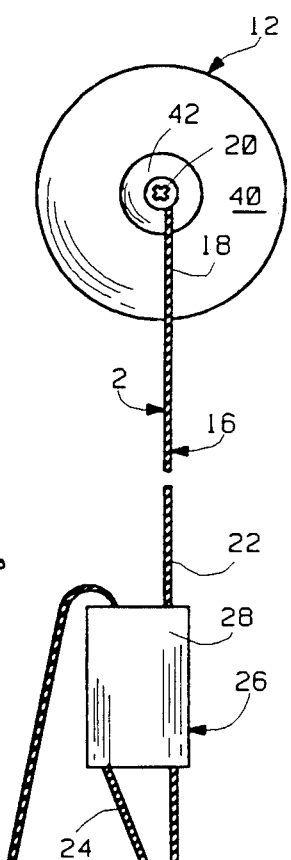
FIG. 3 is a fragmentary, plan view of a device in accordance with the invention for improving comfort of a person seated in a motor vehicle and using a safety belt assembly.
Figure 4:
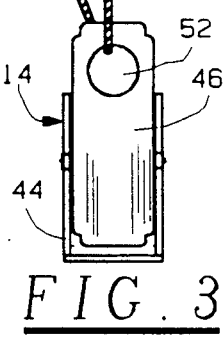
FIG. 4 is a lateral view of the suction cup means of the device of the invention.
Figure 6:
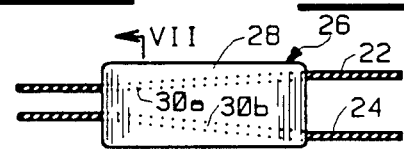
FIG. 6 is a fragmentary plan view of a first embodiment of cord length adjustment means of the device of the invention.
Figure 7:
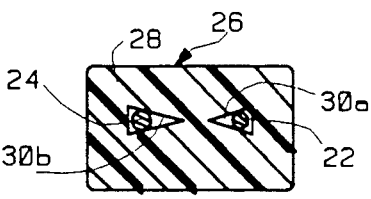
FIG. 7 is a sectional view taken on the line VII—VII of FIG. 6.

In one embodiment shown in FIGS. 3, 6 & 7, the means 26 comprises an elongated body member 28 and a pair of tunnels 30a & 30b of triangular cross-section extending axially through the body member 28 with their apexes facing one another. The first section of the cord 22 passes through tunnel 30a and the second section 24 of the cord passes through the other tunnel 30b.

Figure 8:
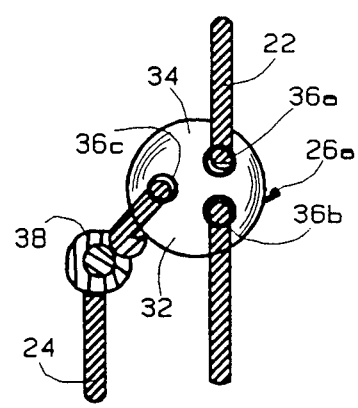
FIG. 8 is a fragmentary plan view of a second embodiment of cord length adjustment means of the device of the invention.

In another embodiment shown in FIG. 8, the means 26a for adjusting the cord length comprises a disc shaped body member 32 having a front face 34 and back face (not shown) and three circular bores 36a, 36b & 36c extending through the body member 32 from the front face 34 to the back face. The first section 22 of the cord 16 passes through the bores 36a & 36b and the second section 24 is fixed through the bore 36c by knot 38.

Figures 5, 9:
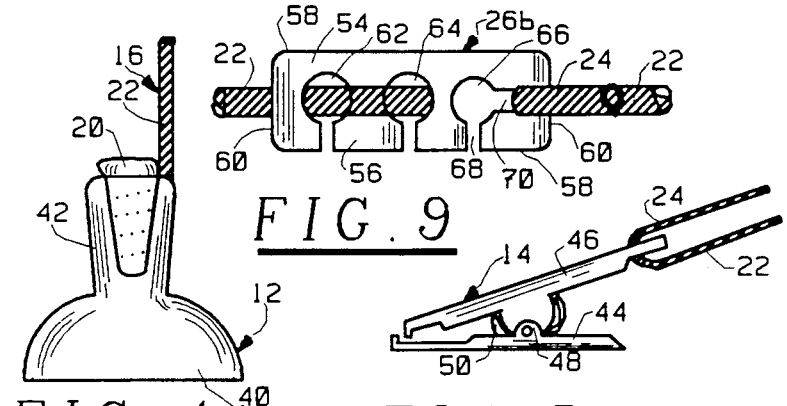
FIG. 5 is a lateral view of the clip means of the device of the invention.
FIG. 9 is a fragmentary plan view of a third embodiment of cord length adjustment means of the device of the invention.

In a third embodiment shown in FIG. 9, the means 26b for adjusting the cord length comprises an elongated plate member 54 defined by a front face 56, a back face (not shown), a pair of parallel longitudinal edges 58 and a pair of parallel transverse edges 60. First, second and third axially aligned and separated bores 62, 64 & 66 respectively extend through the front and back faces. Slots 68 extend from one of said longitudinal edges 58 into each of the bores 62, 64 & 66, and a fourth slot 70 extends axially from third bore 66 part way toward transverse edge 60.

The first section of cord 22 passes through first and second bores 62 & 64 while second cord section 24 is captured in fourth slot 70 by having its end knotted or beaded so it can not slip through the slot 70. As with the embodiment of FIG. 8, the bores 62 & 64 have an I.D. sized relative to the O.D. of the cord 16 so that when the cord is under tension, it will not move through the bores 62 & 64, but when not under tension, it can be manually moved so that the length of the cord section 22 can be adjusted.

Preferably, the suction cup means 12 includes a flexible cup portion 40 and a post 42 extending laterally from portion 40. While the cord 16 is shown attached to the post 42 by the screw 20, any other suitable method of attachment may be used, e.g., cement, staple, plug, etc.

The clip means 14 includes a first jaw member 44, a second jaw member 46 pivoted to the first jaw member on lugs 48. It has a closing bias spring 50 and an opening 52, in jaw member 46 through which the cord 16 is looped. Other forms of clips (not shown) commercially available when be substituted for the precise form shown and described.

The new devices 2 of the invention improve the art of seat belt comfort devices in several ways. First, because they are a unique combination of commercially available, inexpensive components, they can be made and sold at a substantially more favorable cost than related devices of the prior art. Further, their use in a motor vehicle requires no drilling or like alteration of the vehicle.

Use of the new devices 2 for improving comfort of a person 4 seated in a motor vehicle 6 and using safety belt assembly 8 is easily and quickly accomplished.

The suction cup 12 is releasably adhered to the windshield 13, side window or other part of the motor vehicle 6. Then, the clip 14 is attached to a part of the shoulder strap 10 with the cord 16 slidably looped through the opening 52 of the clip. By manipulation of means 26 to adjust the length of the cord 16, the user 4 can pull the strap 10 away from his body to the extent believed necessary to give the desired relief from strap tension. As shown, the cord 16 extends from the suction cup means 12 to the clip means 14 through means 26 having therein a plurality of openings through which separate sections 22 & 24 of the cord extend. These openings are structured relative to the cord, i.e., ID of the openings vs OD of the cord, so that when the cord 16 is under tension it is locked against movement through the openings, but when not under tension, the cord may be manually moved through the openings. This enables the user 4 to quickly adjust or readjust the length of the cord section 22 and, accordingly, the tension applied to his chest, neck and shoulders by the strap 10.

The embodiments of the invention in which an exclusive property or privilege is claimed are defined as follows:

1. A device for improving comfort of a person seated in a motor vehicle and using a safety belt assembly provided therein that includes a shoulder strap, said device comprising:
   suction cup means that may be releasably adhered to the windshield, side window or other part of said motor vehicle,
   clip means that may be releasably attached to a part of said shoulder strap,
   a cord attached at one end to said suction cup means and slidably looped through said clip means creating a first section of said cord that extends from said suction cup means to said clip means and a second section of said cord that leads away from said clip means but does not connect with said suction cup means, and
   means for adjusting the length of said first section of said cord which comprises:
   a disc shaped body member having front and back faces and,
   at least three circular bores extending through said body member from said front face to said back face,
   said first section of said cord passing through two of said bores and said second section of said cord being knotted through another of said bores.

2. A device for improving comfort of a person seated in a motor vehicle and using a safety belt assembly provided therein that includes a shoulder strap, said device comprising:
   suction cup means that may be releasably adhered to the windshield, side window or other part of said motor vehicle,
   clip means that may be releasably attached to a part of said shoulder strap,
   a cord attached at one end to said suction cup means and slidably looped through said clip means creating a first section of said cord that extends from said suction cup means to said clip means and a second section of said cord that leads away from said clip means but does not connect with said suction cup means, and means for adjusting the length of said first section of said cord which comprises:

an elongated body member, a pair of tunnels of triangular cross-section extending axially through said body member with their apexes facing one another, said first section of said cord passing through one of said tunnels and said second section of said cord passing through the other of said tunnels.

3. A device for improving comfort of a person seated in a motor vehicle and using a safety belt assembly provided therein that includes a shoulder strap, said device comprising:

suction cup means that may be releasably adhered to the windshield, side window or other part of said motor vehicle, clip means that may be releasably attached to a part of said shoulder strap, a cord attached at one end to said suction cup means and slidably looped through said clip means creating a first section of said cord that extends from said suction cup means to said clip means and a second section of said cord that leads away from said clip means but does not connect with said suction cup means, and means for adjusting the length of said first section of said cord which comprises:

an elongated plate member defined by a front face, a back face, a pair of parallel longitudinal edges and a pair of parallel transverse edges, first, second and third axially aligned and separated bores extending through said front and back faces, slots extending from one of said longitudinal edges into each of said first, second and third bores, and a fourth slot extending axially from said third bore part way toward said transverse edge adjacent thereto, said first section of cord passing through said first and second bores and said second section of cord being captured in said fourth slot.

* * * * *